United States Patent [19]

Capuano

[11] 4,259,889
[45] Apr. 7, 1981

[54] THREAD TAPPING FORM

[75] Inventor: Terry D. Capuano, Hinckley, Ohio

[73] Assignee: The Lamson & Sessions Co., Cleveland, Ohio

[21] Appl. No.: 68,727

[22] Filed: Aug. 22, 1979

[51] Int. Cl.³ ............................................ F16B 25/00
[52] U.S. Cl. .................................. 411/417; 10/152 T; 411/386
[58] Field of Search ...................... 85/47, 46, 41, 1 L; 151/22, 16, 41.73; 10/152 T, 152 R, 10 R, 141 R; 408/220, 226

[56] References Cited

U.S. PATENT DOCUMENTS

| | | | |
|---|---|---|---|
| 1,309,232 | 7/1919 | Ahond | 10/141 R X |
| 2,183,243 | 12/1939 | Meersteiner | 85/44 X |
| 3,426,642 | 2/1969 | Phipard, Jr. | 85/46 |
| 4,069,730 | 1/1978 | Gutshall | 85/47 |

FOREIGN PATENT DOCUMENTS

| | | | |
|---|---|---|---|
| 210236 | 7/1960 | Austria | 85/46 |
| 324614 | 12/1902 | France | 85/46 |
| 46-35486 | 10/1971 | Japan | 10/152 T |
| 667051 | 2/1952 | United Kingdom | 85/47 |
| 798657 | 7/1958 | United Kingdom | 85/47 |

*Primary Examiner*—Ramon S. Britts
*Attorney, Agent, or Firm*—Yount & Tarolli

[57] ABSTRACT

An improved thread tapping form is used to form an internal thread convolution in a member. The thread tapping form includes a plurality of projections which are disposed on a shank having a circular cross sectional configuration. Each of the thread forming projections includes a leading section which parts the material of the member to initiate formation of the flanks of the internal thread convolution. A side section of each thread forming projection presses against the flanks of the internal thread convolution to further form the flanks. A trailing section of each projection supports the side and leading sections of the projection.

7 Claims, 6 Drawing Figures

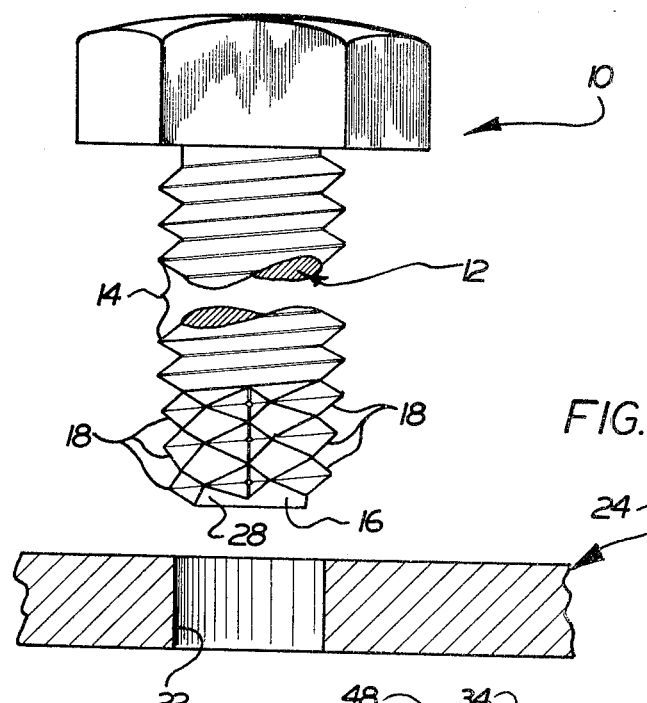
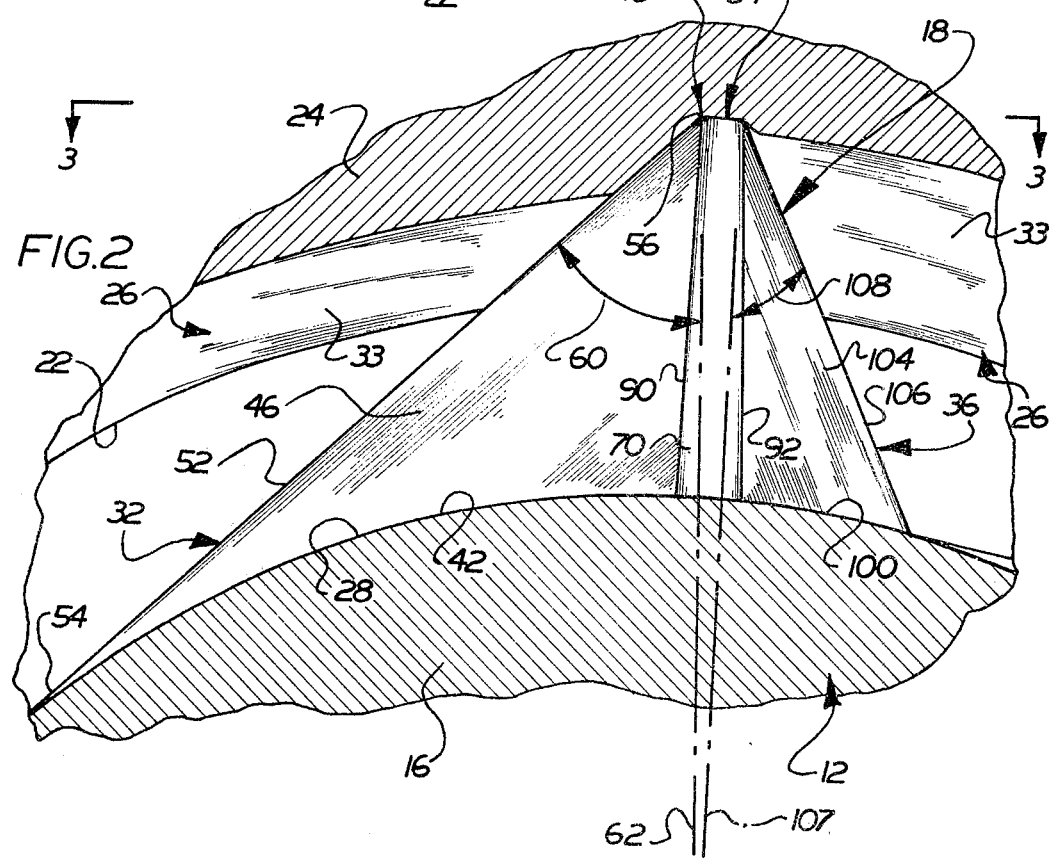

U.S. Patent  Apr. 7, 1981  Sheet 2 of 2  4,259,889
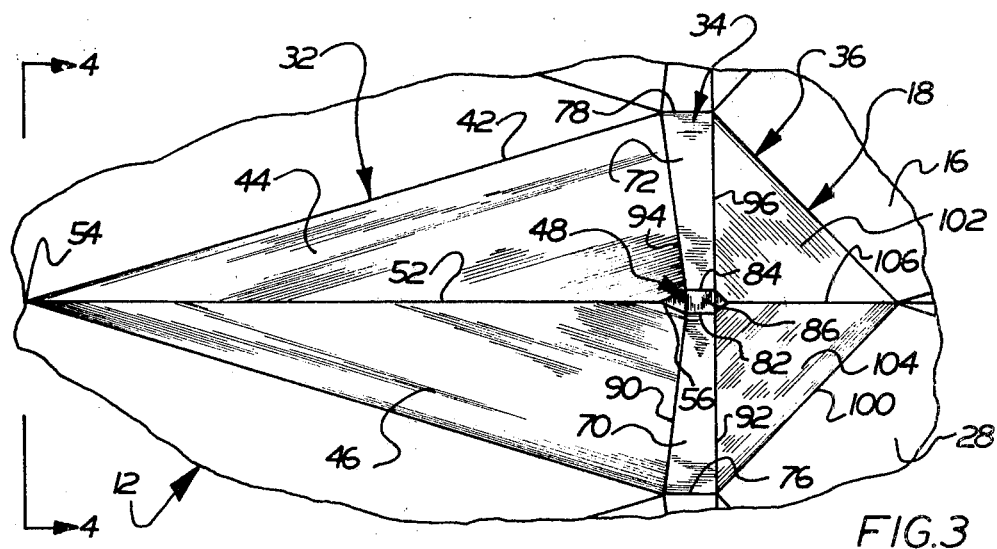
FIG.3
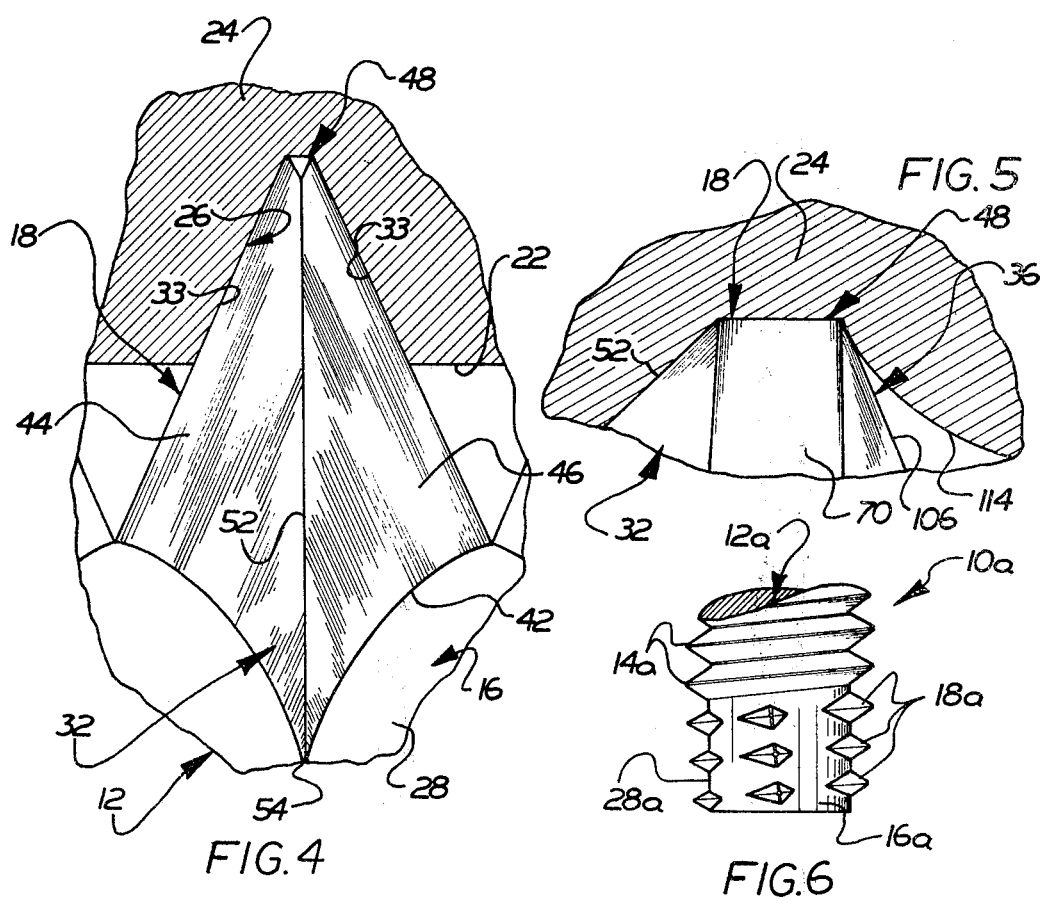
FIG.4
FIG.5
FIG.6

THREAD TAPPING FORM

BACKGROUND OF THE INVENTION

The present invention relates generally to a thread tapping form which is used to form an internal thread convolution in a member. More specifically, the present invention relates to a thread tapping form having a leading section which parts the material of the member to initiate the formation of the flanks of an internal thread convolution and a side section which presses against the flanks of the internal thread convolution to further form the surfaces of the flanks.

A known thread tapping form is disclosed in U.S. Pat. No. 1,309,232. This known thread tapping form includes a thread forming tooth or projection which, when viewed along the axis of a tap, has a generally triangular configuration. It should be noted that the thread forming tooth disclosed in this patent does not have a long leading edge to enter the material positively, a flat crest to assist in forming the desired helix angle or a flat side surface area which extends between the root and crest of the thread. In addition, the thread forming tooth disclosed in this patent has a configuration such that it will cut away a portion of the member in which a hole is to be tapped.

Other thread tapping forms are disclosed in U.S. Pat. No. 3,426,642. These thread tapping forms are associated with a self-tapping screw. Some of the thread tapping forms disclosed in this patent are formed as bulges in the crest and flanks of a thread. In other embodiments, the thread tapping forms appear as bulges which are disposed on the shank of the fastener without a thread between the bulges.

SUMMARY OF THE PRESENT INVENTION

An improved thread tapping form is used to form an internal thread convolution in a member. The thread tapping form includes a plurality of thread forming projections which are disposed on a shank. Each of the thread forming projections has a leading section which parts the material of the member to initiate formation of the flanks of an internal thread convolution. This is accomplished without cutting away material from the member in which the thread convolution is being formed.

Immediately behind the leading section is a side section having a pair of flat side surfaces which extend at the same angle relative to each other as the angle between flank surfaces of adjacent turns of a standard thread convolution. This enables the side surfaces to press against and smooth out the flank surfaces the internal thread convolution. A trailing section extends rearwardly from the side section and is effective to support the side section and the leading section of the thread forming projection.

The leading section of the thread forming projection has a relatively long leading edge which extends along the shank at the same pitch angle as is desired for the internal thread convolution. The long leading edge positively enters into the member so that formation of the internal thread is initiated at the desired pitch angle.

A pair of triangular sides flare outwardly from the leading edge and extend from the crest to the base of the leading section of the thread forming projection. The triangular sides are relatively long in the direction in which the flank surfaces are formed. This enables the leading edge to part and cold work the material of the member in which the thread convolution is being formed along a substantial area of the thread forming projection to distribute the forces required to form the flanks of the internal thread convolution over a relatively large area. This tends to reduce the stress on any one area of the leading section of the thread forming projection. If the thread forming projection was relatively sharp or blunt, higher stresses would be present with a resulting tendency to wear or break the thread forming projection.

The side section of the thread forming projection has a pair of generally rectangular side surfaces which extend at the same acute angle equal to each other as the desired acute angle between the flank surfaces of adjacent turns of the internal thread. The side surfaces iron or smooth the flank surfaces which are initially formed by the leading section of the thread forming projection. Although the smoothing action of the side surfaces on the flanks of the internal thread convolution is important in order to provide well defined flank surfaces at the desired angle relative to each other, the extent of the area of engagement of the side surfaces with the flanks of the internal thread convolution is minimized in order to reduce the driving torque required to form the internal thread convolution.

The trailing section of the thread forming projection supports the side and leading sections of the thread forming projection. The trailing section of the thread forming projection is relatively short and has a pair of side surfaces which taper sharply inwardly to a trailing edge in order to minimize the extent of engagement between the trailing section and the flanks of the internal thread convolution. This also tends to minimize the driving torque required to form the thread.

The thread forming projection has a crest portion which forms the root of the internal thread convolution. The distance between leading and trailing ends of the crest portion is relatively short to further minimize the contact area between the thread forming projection and the internal thread convolution. In addition, the short extent of the crest portion enables the material of the internal thread convolution to spring back behind the crest portion to hold the thread forming convolution against reverse movement. When the thread forming projection is used in association with a fastener, the resulting gripping engagement between the root of the internal thread convolution and the crest portions of the thread forming projections provides a locking action to prevent loosening of the fastener.

Accordingly, it is an object of this invention to provide a new and improved thread tapping form which minimizes the stresses induced in a thread tapping projection and the torque required to form an internal thread convolution by minimizing the area of contact between the thread forming projection and the internal thread convolution and wherein the thread forming projection has a leading section which parts the material of the member to initiate the formation of the flanks of the internal thread convolution and a side section which presses against the flanks of the internal thread convolution to smooth the flank surfaces.

Another object of this invention is to provide a new and improved thread tapping form as set forth in the preceding object and wherein the thread forming projection includes a trailing section which supports the leading and side sections of the thread forming projection and has a relatively short extent to tend to minimize engagement of the trailing section and internal thread convolution.

Another object of this invention is to provide a new and improved thread tapping form as set forth in either of the preceding objects and wherein the leading section of the thread forming projection has a relatively long leading edge to tend to reduce the stresses which are induced in the thread forming projection.

BRIEF DESCRIPTION OF THE DRAWINGS

The foregoing and other objects and features of the present invention will become more apparent upon a consideration of the following description taken in connection with the accompanying drawings wherein:

FIG. 1 is a partially broken-away illustration depicting a fastener having a thread tapping form which is constructed in accordance with the present invention and is to be utilized to form an internal thread in an untapped hole in a member;

FIG. 2 is an enlarged illustration depicting the relationship between a thread forming projection on the fastener of FIG. 1 and the material of the member during the forming of an internal thread convolution in the member;

FIG. 3 is a top plan view, taken generally along the line 3—3 of FIG. 2, further illustrating the construction of the thread forming projection, the projection being shown in FIG. 3 apart from the member in which an internal thread convolution is being formed;

FIG. 4 is an elevational view, taken generally along the line 4—4 of FIG. 3 further illustrating the relationship between the thread forming projection and the member in which a thread being formed;

FIG. 5 is an enlarged fragmentary sectional view illustrating the relationship between the crest portion of the thread forming projection of FIG. 2 and the root of the internal thread convolution formed in the member; and FIG. 6 is a fragmentary illustration of a second embodiment of the thread tapping form.

DESCRIPTION OF SPECIFIC PREFERRED EMBODIMENTS OF THE INVENTION

A fastener 10 (FIG. 1) has a shank 12 with a cylindrical inner end or trailing portion upon which a standard thread convolution 14 is formed. The shank 12 also has a tapered leading or outer end portion 16 upon which a plurality of identical thread forming projections 18 constructed in accordance with the present invention are disposed. The thread forming projections 18 are aligned along a helical path having the same pitch as the standard thread convolution 14. Therefore, an internal thread convolution formed in an untapped hole 22 in a member 24 by the projections 18 will have the same pitch as the turns of the standard thread convolution 14.

The leading end portion 16 of the shank 12 is tapered. This taper is such that the outermost turn of projections 18 has a crest diameter which is only slightly greater than the diameter of the hole 22. Therefore, when the leading end portion 16 of the shank is pressed downwardly into the hole 22, the crests of the projections 18 on the leading end of the fastener can engage the metal member 24 and initiate the forming of an internal thread convolution 26.

As the fastener 10 is turned into the untapped hole 22, the thread forming projections 18 sequentially cold work the metal member 24 with a swaging action to complete the formation of the internal thread convolution 26 (FIG. 2). The completely formed internal thread convolution 26 is shaped for mating engagement with the standard thread convolution 14 on the shank of the thread 12. Thus, the inner most turn of the helical array of thread forming convolutions 18 is effective to swage the internal thread convolution 26 to a shape for mating engagement with the internal thread convolution 14. This shape is such that the flanks of the internal thread convolution are disposed in tight abutting engagement with the flanks of the external thread convolution 14.

In the embodiment of the invention illustrated in FIG. 1, the leading end portion 16 of the shank 12 is tapered and each of the thread forming projections 18 has the same height from a frustoconical outer surface 28 of the shank. It should be noted that although the leading end portion 16 of the shank is tapered, the portion of the shank upon which the standard thread convolution 14 is formed is cylindrical. The leading end portion 16 of the shank 12 was tapered in order to provide for the gradual formation of the internal thread convolution by each of the thread forming projections 18 in turn. This tends to minimize the extent to which the material of the metal member 24 is swaged by any one thread forming projection 18 with a resulting reduction in the force applied against any one thread forming projection.

The identical construction of the thread forming projections 18 and the interaction between the projections and the member 24 is further illustrated in FIGS. 2-5. Thus, a thread forming projection 18 constructed in accordance with the present invention has a leading section 32 (see FIGS. 2 and 3) which parts the material of the metal member 24 to initiate the formation of the flank surfaces 33 of the internal thread convolution 26. In addition, the leading section 32 swages or cams apart the portion of the flank surfaces 33 formed by the preceding projections 18 and the portion of the flank surfaces initially formed by the parting action of the leading section.

The leading section 32 of the thread forming projection 18 has a relatively large circumferential extent (FIG. 2) about the circumference of the shank 12. Therefore, the forces resulting from the formation of the internal thread convolution 26 are distributed over a relatively large area of the leading section 32. This tends to minimize the level of stress which is present in the various areas of the leading section 32 to thereby tend to minimize plastic deformation and/or wear of the leading section. In addition, the relatively long circumferential extent of the leading section 32 enables it to enter the material of the member 24 positively to initiate the formation of the internal thread convolution 26 with a pitch which is the same as the pitch of the standard thread 14 (FIG. 1).

Immediately behind the leading section 32 of the thread forming projection 18 is a side section 34 (FIGS. 2 and 3). The side section 34 presses against the flanks 33 of the internal thread convolution 26 to further form the flanks. This pressing action smooths or irons the flanks 33 of the internal thread convolution 26 to form smooth flank surfaces which will not abrade or gouge the flank surfaces of the standard thread convolution 14.

The side section 34 has a relatively short extent along the circumference of the shank 12 to minimize the extent of engagement of the side section with the flanks 33 of the internal thread convolution 26. By minimizing the extent of engagement of the side section 34 with the flanks of the internal thread convolution, the torque or force required to turn the fastener 10 into the unthreaded hole 22 (FIG. 1) is minimized. However, it should be understood that the extent of the side section 34 (FIG. 2) is sufficient to positively form the flanks 33 of the internal thread convolution 26.

Immediately behind the side section 34 is a trailing section 36 (FIGS. 2 and 3) of the thread forming projection 18. The trailing section 36 supports the side section 34 and leading section 32 of the projection 18 to enable the projection to withstand forces applied against it during the forming of an internal thread convolution. It should be noted that the trailing section 36 of the thread forming projection 18 has a relatively short axial extent and tapers sharply inwardly and tend to minimize the extent of engagement of the trailing section 36 with the internal thread convolution 26. This tends to minimize the torque required to turn the fastener 10 (FIG. 1) into the untapped hole 22 in the member 24.

The leading section 32 (FIGS. 2, 3 and 4) of the thread forming projection 18 has a generally tetrahedronal configuration. Thus, the leading section 32 of the thread forming projection 18 has a triangular base 42 which is disposed on the circular outer side surface 28 of the shank 12. In addition, the leading section 32 has a pair of triangular side surfaces 44 and 46 which extend upwardly from the outer side surface 28 of the shank 12 to a crest portion 48 of the thread forming projection. The fourth triangular side of the tetrahedronal leading section 32 is formed at the plane of intersection between the leading section 32 and the side section 34.

The two flat triangular side surfaces 44 and 46 (see FIGS. 3 and 4) of the thread forming projection 18 intersect along a generally straight leading edge 52 of the thread forming projection. The leading edge 52 has a leading end 54 at the point of intersection of the leading edge with the frustoconically tapered outer surface 28 of the shank 12. In addition, the leading edge 52 has a trailing end 56 at a point of engagement with the leading edge 52 with the crest portion 48 of the thread forming projection 18.

The leading edge 52 has a relatively gradual slope (see FIG. 2) to provide for positive engagement of the leading edge with the material of the member 24. In addition, the gradual slope of the leading edge 52 promotes a smooth parting action with the metal member 24. The leading edge 52 cuts the material of the member 24 with a parting action to initiate the formation of portions of the flank surfaces 33 of the internal thread convolution. It should be noted that this occurs without removal of chips or other material from the member 24.

In the specific preferred embodiment of the invention illustrated in FIG. 2, the leading edge 52 extends tangentially to the inner side surface 28 of the shank 12. However, it is contemplated that, if desired, the leading edge 52 could extend chordally to the outer surface 28 of the shank 12 as long as there is a gradual sloping of the leading edge 52 rearwardly in the manner shown in FIG. 2 in order to provide for a positive entrance of the leading section 32 into the material of the member 24. Thus, it is contemplated that the angle indicated at 60 in FIG. 2 between the leading edge 52 and a radially extending line 62 between the center of the shank 12 and the intersection of the leading edge 52 with the crest 48 will be between 40° and 70°.

The triangular side surfaces 44 and 46 flare outwardly from the leading edge 52 to the side section 34. After the leading edge 52 has cut the material of the member 24 to initiate the formation of flank surfaces 33 of an internal thread convolution, the triangular side surfaces 44 and 46 press the flank surfaces away from each other with a swaging or camming action to further form the internal thread convolution. The angle between the flat sides 44 and 46 is the same as the angle between the flank surfaces of the external thread convolution 14, that is, 60° for a unified thread and 55° for a Whitworth thread.

The flat side surfaces 44 and 46 and the leading edge 52 extend from the base 42 to the crest portion 48 of the thread forming projection. However, the thread forming projections 18 do not utilize the entire leading edge 52 to part the metal of the member 24. Thus, the radially outer portion of the thread forming projections 18 part the metal to initiate the formation of the flank surfaces 33 in the manner shown in FIG. 2. The side surfaces 44 and 46 of the thread forming projections separate the flank surfaces 33. The thread forming projection 18 is rolled on the shank 12. Therefore, there will be a very slight radius between the surfaces 44 and 46.

The side surfaces 44 and 46 of the thread forming projections 18 which are disposed inwardly from the outer end of the shank 12, that is the thread forming projections 18 which are close to the standard thread convolution 14, are used to form flank surfaces throughout substantially their entire radial extent. However, the side surfaces 44 and 46 of the thread forming projections which are disposed adjacent to the outer end of the shank 12 are not used to form flank surfaces throughout their entire radial extent. This is because the thread forming projections 18 all have the same configuration and the leading end portion 6 of the shank tapers or flares outwardly toward the cylindrical main portion of the shank 12 upon which the standard thread convolution 14 is disposed. Therefore, the radially outer portion of the thread forming projections 18 on the relatively small diameter leading end portion of the shank 12 interfere to a relatively small extent with the material of the member 24. The thread forming projections on the relatively large diameter inner end of the tapered portion 16 of the shank interfere throughout substantially their entire radial extent with the material of the member 24.

The side section 34 includes a pair of generally flat side surfaces 70 and 72 which extend from the outer side surface 28 of the shank 12 to the crest portion 48 of the thread forming projection 18 (see FIG. 3). The side surfaces 70 and 72 have straight radially inner edges 76 and 78 which extend parallel to each other and are disposed at the base of the side section 34. In addition, the side surfaces 70 and 72 have a pair of straight outer edges 82 and 84 which extend parallel to each other and to the inner edges 76 and 78. The outer edges 82 and 84 are disposed on opposite sides of a flat surface 86 of the crest portion 48.

The side surfaces 70 and 72 are both disposed in flat planes which intersect each other at an acute angle which is equal to the acute angle between the flank surfaces of the external thread 14. Thus, when the external thread 14 is a unified thread having a 60° angle between the flank surfaces, the side surfaces 70 and 72 of the side portion 34 will intersect at an acute angle of 60°. This enables the side surfaces 70 and 72 to swage the flanks of the internal thread convolution at the proper angle for engagement by the external thread convolution 14. Of course if the angle between the flank surfaces of the external thread convolution 14 was different, for example if the external thread is a Whitworth thread having a flank angle of 55°, the angle between the flat side surfaces 70 and 72 would also be 55°.

The distance from a generally straight leading edge 90 of the side surface 70 to a generally straight trailing edge 92 (see FIG. 2) is less than the circumferential extent of the leading section 32 about the shank 12. The relatively short distance between the edges 90 and 92 minimizes the extent of engagement of the side surfaces 70 and 72 with the flanks of an internal thread convolution to thereby minimize the contact area during thread tapping and the torque required to drive the fastener 10. Similarly, the side surface 72 (see FIG. 3) has a relatively short distance between the leading edge 94 and a trailing edge 96. It should be noted that although the spacing between the edges 90 and 92 and the spacing between the edges 94 and 96 varies with the distance from the center of the shank 12, the edges 90 and 92 are spaced apart by the same distance as the edges 94 and 96 at the same radial distance from the center of the shank 12.

The trailing section 36 of the thread forming projection 18 has a generally tetrahedronal configuration similar to the configuration of the leading section 32 of the thread forming projection. However, the extent of the trailing section 36 about the circumference of the shank 12 is substantially less than the extent of the leading section 32. This is because the trailing section 36 is substantially ineffective to form the thread convolution 26 and merely provides support to strengthen the thread forming projection 18.

The trailing section 36 has a generally triangular base 100 (FIG. 3) which engages the shank 12. A pair of triangular side surfaces 102 and 104 are disposed on opposite sides of the base 100 and extend outwardly from the shank to an intersection at a straight trailing edge 106. The flat side surfaces 102 and 104 of the trailing section 36 extend from the shank 12 to the crest portion 48 of the thread forming projection. The triangular sides 102 and 104 intersect the side section 34 at the straight edges 92 and 96. Similarly, the triangular side surfaces 44 and 46 of the leading section 32 intersect the side section 34 at the straight edges 90 and 94.

The trailing edge 106 (FIG. 2) of the trailing section 36 intersects a radial line from the center of the shank 12 through the intersection of the trailing edge with the crest portion 48 of the thread forming projection at an angle indicated at 108 and having a magnitude of between 15° and 35°. It should be noted that this results in the trailing edge 106 extending along a generally straight line which forms a chord to the circular shank 12.

In order to minimize the forces required to form an internal thread convolution, the crest portion 48 has a length measured along the line of intersection between the crest surface 86 and a radial plane extending through the shank 12 which is less than 15 percent of the height of the projection. The height of the projection is measured from the plane of the shank surface 28 to the crest surface 86 along the radial plane.

If the fastener 10 is secured into a thick member 24 or into a member having a hole which does not extend all the way through the member, the thread forming projections will cooperate with the internal thread convolution to lock or hold the fastener against rotational movement relative to the member. Thus, as the crest portion 48 swages the material of the member to form the internal thread convolution, the material of the member tends to resiliently spring back behind the crest portion 48 in the manner shown in FIG. 5. This results in the root 114 of the internal thread convolution engaging the back side or trailing section 36 of the thread forming projection 18 to hold the projection against rotational movement in a direction tending to loosen the fastener 10.

In the embodiment of the invention illustrated in FIG. 1, the thread forming projections 18 are disposed on a frustoconical leading end portion 16 of the shank 12 and extend radially outward from the outer surface 28 of the leading end portion 16 through the same distance to provide for a gradual formation of an internal thread convolution. In the embodiment of the invention illustrated in FIG. 6, the leading end portion of the shank has a generally cylindrical configuration and the radial extent of the thread forming projections varies to provide for sequential formation of the internal thread convolution. Since the embodiment of the invention shown in FIG. 6 has many components which are generally the same as the embodiment of the invention shown in FIGS. 1–5, similar numerals will be utilized to designate similar components, the suffix letter "a" being associated with the letters of FIG. 6 in order to avoid confusion.

The fastener 10a of FIG. 6 has a shank 12a with a cylindrical portion upon which a standard thread convolution 14a is disposed. The shank 12a has a cylindrical leading end portion 16a upon which a plurality of thread forming projections 18a are disposed. Each of the thread forming projections 18a has the same general configuration as the thread forming projection 18 of FIGS. 1–5. However, the thread forming projections 18a extend outwardly from an outer side surface 28a of the leading end portion 16a of the shank 12a to different extents. Therefore, a line which extends axially along the shank 12a through the crest portions of the thread forming projections 18a would slope inwardly toward the central axis of the shank 12a.

In view of the foregoing description, it is apparent that an improved thread tapping form is used to form an internal thread convolution in a member. The thread tapping form includes a plurality of thread forming projections 18 which are disposed on a shank 12. Each of the thread forming projections 18 has a leading section 32 which parts the material of the member 24 to initiate formation of the flanks 33 of an internal thread convolution 26. This is accomplished without cutting away material from the member 24 in which the thread convolution 26 is being formed.

Immediately behind the leading section 32 is a side section 34 having a pair of flat side surfaces 70 and 72 which extend at the same angle relative to each other as the angle between flank surfaces of adjacent turns of a standard thread convolution. This enables the side surfaces 70 and 72 to press against and smooth out the flank surfaces 33 of the internal thread convolution 26. A trailing section 36 extends rearwardly from the side section 34 and is effective to support the side section and the leading section 36 of the thread forming projection 18.

The leading section 32 of the thread forming projection 18 has a relatively long leading edge 52 which extends along the shank 12 at the same pitch angle as is desired for the internal thread convolution 26. The long leading edge 52 positively enters into the member 24 so that formation of the internal thread 26 is initiated at the desired pitch angle.

A pair of triangular sides 44 and 46 flare outwardly from the leading edge and extend from the crest 48 to the base 42 of the leading section 32 of the thread forming projection 18. The triangular sides 44 and 46 are relatively long in the direction in which the flank surfaces are formed. This enables the leading edge 52 to part and cold work the material of the member 24 in which the thread convolution 26 is being formed along a substantial area of thread forming projection 18 to distribute the forces required to form the flanks 26 of the internal thread convolution over a relatively large area. Thus tends to reduce the stress on any one area of the leading section 32 of the thread forming projection 18. If the thread forming projection 18 was relatively sharp or blunt, higher stresses would be present with a resulting tendency to wear or break the thread forming projection.

The side section of the thread forming projection has a pair of generally rectangular side surfaces 70 and 72 which extend at the same acute angle equal to each other as the desired acute angle between the flank surfaces 33 of adjacent turns of the internal thread. The side surfaces 70 and 72 iron or smooth the flank surfaces 33 which are initially formed by the leading section 32 of the thread forming projection. Although the smoothing action of the side surfaces 70 and 72 on the flanks 33 of the internal thread convolution 26 is important in order to provide well defined flank surfaces at the desired angle relative to each other, the extent of the area of engagement of the side surfaces 70 and 72 with the flanks 33 of the internal thread convolution 26 is minimized in order to reduce the driving torque required to form the internal thread convolution.

The trailing section 36 of the thread forming projection 18 supports the side and leading sections of the thread forming projection. The trailing section 36 of the thread forming projection 18 is relatively short and has a pair of side surfaces 102 and 104 which taper sharply inwardly to a trailing edge 106 in order to minimize the extent of engagement between the trailing section 36 and the flanks of the internal thread convolution. This also tends to minimize the driving torque required to form the thread.

The thread forming projection 18 has a crest portion 48 which forms the root 114 of the internal thread convolution 26. The distance between leading and trailing ends of the crest portion 48 is relatively short to further minimize the contact area between the thread forming projection 18 and the internal thread convolution 26. In addition, the short extent of the crest portion 48 enables the material of the internal thread convolution to spring back behind the crest portion 48 to hold the thread forming convolution against reverse movement (see FIG. 5). When the thread forming projection is used in association with a fastener, the resulting gripping engagement between the root 114 of the internal thread convolution 26 and the crest portion of the thread forming projections provides a locking action to prevent loosening of the fastener.

Having described one specific preferred embodiment of the invention, the following is claimed:

1. A thread tapping form for use in forming an internal thread convolution in a member, said thread tapping form comprising an axially extending shank, said shank having a circular cross sectional configuration in a radial plane extending perpendicular to a longitudinal central axis of said shank, and a plurality of thread forming projections disposed on said shank, each one of said thread forming projections including a leading section which parts the material of the member to initiate formation of the flanks of the internal thread convolution and a side section which presses against the flanks of the internal thread convolution, said leading section of said one of said projections having a generally tetrahedronal configuration with a triangular base disposed on said shank, a pair of triangular side surfaces disposed on opposite sides of said triangular base and extending radially outwardly of said shank from said base to a crest portion of said one projection, said triangular side surfaces intersecting to form a leading edge of said projection, said leading edge of said projection extending from said shank to said crest portion of said one projection to part the material of the member and initiate the forming of flank surfaces of an internal thread convolution in the member, said triangular side surfaces of said leading section flaring outwardly from said leading edge to said side section to enable said triangular side surfaces to press the flank surfaces of the internal thread convolution apart with a wedging action, said side section of said one projection including a pair of generally rectangular side surfaces which extend at an acute angle relative to each other from base edges at said shank to outer edges at said crest portion of said one projection, said base edges of said side surfaces extending parallel to each other and to said outer edges, said rectangular side surfaces of said side section having leading edge portions which intersect said triangular side surfaces of said leading section at trailing edge portions of said triangular side surfaces, said rectangular side surfaces of said side section being disposed in flat planes which intersect at an acute angle which is equal to an acute angle between flank surfaces of adjacent turns of the internal thread convolution, said side section of said one projection having a crest surface which extends between said outer edges of said rectangular side surfaces to form a root portion of the internal thread.

2. A thread tapping form as set forth in claim 1 wherein said leading edge of said one projection intersects a radial line from the center of said shank through the intersection of said leading edge with the crest portion of said one projection at an angle of between 40 degrees and 70 degrees.

3. A thread tapping form as set forth in claim 1 wherein said crest surface on said one projection has a length which is measured along a line of intersection between said crest surface and a radial plane through said shank and which is less than 15 percent of the height of said one projection as measured from the shank to said crest surface along the radial plane.

4. A thread tapping form as set forth in claim 1 wherein said one of said thread forming projections further includes a trailing section which supports said side section, said trailing section of said one projection having a generally tetrahedronal configuration with a triangular base disposed on said shank, a pair of triangular side surfaces disposed on opposite sides of said triangular base of said trailing section and extending radially outwardly of said shank to an intersection with said crest surface, said triangular side surfaces of said trailing section intersecting to form a trailing edge of said one projection, said trailing edge of said projection extending from said shank to said crest portion of said one projection.

5. A thread tapping form as set forth in claim 4 wherein said rectangular side surfaces of said side section having trailing edge portions which intersect said triangular side surfaces of said trailing section at leading edge portions of said triangular side surfaces of said trailing section.

6. A thread tapping form as set forth in claim 5 wherein said trailing edge of said one projection intersects a radial line from the center of said shank through the intersection of said trailing edge with the crest portion of said one projection at an angle of between 15 and 35 degrees.

7. A thread tapping form as set forth in claim 4 wherein said leading edge of said one projection extends along a line which is tangential to said shank, said trailing edge of said one projection extending along a line which is chordal to said shank.

* * * * *